United States Patent
Fu et al.

(10) Patent No.: US 11,537,530 B2
(45) Date of Patent: Dec. 27, 2022

(54) NON-VOLATILE STORAGE CONTROLLER WITH PARTIAL LOGICAL-TO-PHYSICAL (L2P) ADDRESS TRANSLATION TABLE

(71) Applicant: Innogrit Technologies Co., Ltd., Shanghai (CN)

(72) Inventors: Bo Fu, Cupertino, CA (US); Chi-Chun Lai, Zhubei (TW); Jie Chen, Milpitas, CA (US); Dishi Lai, San Jose, CA (US); Jian Wu, Fremont, CA (US); Cheng-Yun Hsu, Taichung (TW); Qian Cheng, Chengdu (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 17/315,585

(22) Filed: May 10, 2021

(65) Prior Publication Data

US 2022/0358051 A1    Nov. 10, 2022

(51) Int. Cl.
*G06F 12/10* (2016.01)
*G06F 12/1045* (2016.01)
*G06F 12/0802* (2016.01)

(52) U.S. Cl.
CPC ...... *G06F 12/1054* (2013.01); *G06F 12/0802* (2013.01); *G06F 2212/68* (2013.01)

(58) Field of Classification Search
CPC ............. G06F 12/0802; G06F 12/1054; G06F 2212/68
USPC ......................................................... 711/118
See application file for complete search history.

(56) References Cited

U.S. PATENT DOCUMENTS

2019/0332551 A1* 10/2019 Siegel ................. G06F 12/1027
2021/0342268 A1* 11/2021 Lloyd .................. G06F 9/3001

* cited by examiner

*Primary Examiner* — Hua J Song
(74) *Attorney, Agent, or Firm* — IPro, PLLC

(57) ABSTRACT

Systems, apparatus and methods are provided for logical-to-physical (L2P) address translation. A method may comprise receiving a request for a first logical data address (LDA), and calculating a first translation data unit (TDU) index for a first TDU. The first TDU may contain a L2P entry for the first LDA. The method may further comprise searching a cache of lookup directory entries of recently accessed TDUs using the first TDU index, determining that there is a cache miss, generating and storing an outstanding request for the lookup directory entry for the first TDU in a miss buffer, retrieving the lookup directory entry for the first TDU from an in-memory lookup directory, determining that the lookup directory entry for the first TDU is not valid, reserve a TDU space for the first TDU in a memory and generating a load request for the first TDU.

18 Claims, 4 Drawing Sheets

NON-VOLATILE STORAGE CONTROLLER WITH PARTIAL LOGICAL-TO-PHYSICAL (L2P) ADDRESS TRANSLATION TABLE

TECHNICAL FIELD

The disclosure herein relates to non-volatile storage systems, particularly relates to logical-to-physical address translation in non-volatile storage controllers.

BACKGROUND

Computing systems have traditionally used a wide variety of non-volatile storage devices to maintain and store data and instructions, for example, floppy disks, hard drives, magnetic tapes, optical discs. More recently, non-volatile storage devices have gained wide usage in memory cards, USB flash drives and solid-state drives (SSDs). Data is stored in the non-volatile storage devices according to physical data addresses. But the host computers normally access the data using logical data addresses so logical-to-physical translation tables are needed by the storage controllers.

Most storage controllers store a full logical-to-physical (L2P) address translation table in the memory space for the controller to speed up the data access. As the density of non-volatile storage device increases, this approach will require a large size of memory space of the controller, which will increase the cost of non-volatile storage systems (e.g., SSDs). It also becomes very challenging to put enough memory on the PCB for a non-volatile storage system with a small form factor, for example, the M.2 format factor. Therefore, there is a need in the art to minimize the memory space used for logical-to-physical address translation in non-volatile storage controllers.

SUMMARY

The disclosed subject matter relates to systems, methods, and devices that provide logical-to-physical (L2P) address translation in storage controllers. The techniques of using a partial L2P address translation table in storage controllers described herein may reduce the memory space used for L2P address translation in storage controllers. A subset of entries of a full L2P address translation table may be loaded into the memory of a storage controller. A lookup directory with the number of entries matching the number of entries of translation data units (TDUs) of a full L2P address translation table may be maintained in the memory of the storage controller. The lookup directory may keep track of which TDUs have been loaded into the memory space of the storage controllers.

Every time when a TDU is loaded from a non-volatile storage device to the memory of the storage controller or flushed from the memory of the storage controller to the non-volatile storage device, the corresponding lookup directory entry may be updated. A TDU may be loaded into any available TDU space in the memory of the storage controller and the lookup directory may keep track of where in the memory the TDU is loaded into. If the lookup directory entry for a TDU is invalid, it means that this TDU has not been loaded into the memory of the storage controller and a load request for this TDU may be sent to the non-volatile storage device.

In some embodiments, the recently accessed lookup directory entries may be maintained in a cache and the cache may be checked first to determine whether a TDU is already in the memory. Cache misses may be tracked in a miss buffer (e.g., a miss status holding register (MSHR)). The miss buffer may handle multiple cache misses for requests to the lookup directory entry for the same TDU or to the lookup directory entries for different TDUs, and reduce the TDU load overhead caused by the use of partial L2P address table.

In an exemplary embodiment, there is provided a method that may comprise: receiving a request for a first logical data address (LDA); calculating a first translation data unit (TDU) index for a first TDU, the first TDU containing a logical-to-physical (L2P) entry for the first LDA; searching a cache of lookup directory entries of recently accessed TDUs using the first TDU index; determining that the cache does not have a lookup directory entry for the first TDU; generating and storing an outstanding request for the lookup directory entry for the first TDU in a miss buffer; retrieving the lookup directory entry for the first TDU from an in-memory lookup directory in a memory; determining that the lookup directory entry for the first TDU is not valid; reserving a TDU space for the first TDU in the memory; and generating a load request for the first TDU.

In another exemplary embodiment, there is provided an apparatus that may comprise: a processor, and a logical-to-physical (L2P) translation engine. The L2P translation engine may comprise a cache of lookup directory entries of recently accessed translation data units (TDUs) and a miss buffer. And the L2P translation engine may be configured to: receive a request for a first logical data address (LDA) from the processor; calculate a first TDU index for a first TDU, the first TDU containing a L2P entry for the first LDA; search the cache of lookup directory entries of recently accessed TDUs using the first TDU index; determine that the cache does not have a lookup directory entry for the first TDU; generate and store an outstanding request for the lookup directory entry for the first TDU in the miss buffer; retrieve the lookup directory entry for the first TDU from an in-memory lookup directory in a memory coupled to the apparatus; determine that the lookup directory entry for the first TDU is not valid; reserve a TDU space for the first TDU in the memory and generate a load request for the first TDU.

In yet another exemplary embodiment, disclosed herein may also include a non-transitory machine-readable medium having executable instructions, that the executable instructions, when executed by a storage controller, may cause the storage controller to: receive a request for a first logical data address (LDA); calculate a first translation data unit (TDU) index for a first TDU, the first TDU containing a logical-to-physical (L2P) entry for the first LDA; search a cache of lookup directory entries of recently accessed TDUs using the first TDU index; determine that the cache does not have a lookup directory entry for the first TDU; generate and storing an outstanding request for the lookup directory entry for the first TDU in a miss buffer; retrieve the lookup directory entry for the first TDU from an in-memory lookup directory in a memory coupled to the storage controller; determine that the lookup directory entry for the first TDU is not valid; reserve a TDU space for the first TDU in the memory and generate a load request for the first TDU.

DETAILED DESCRIPTION

Figure 1:
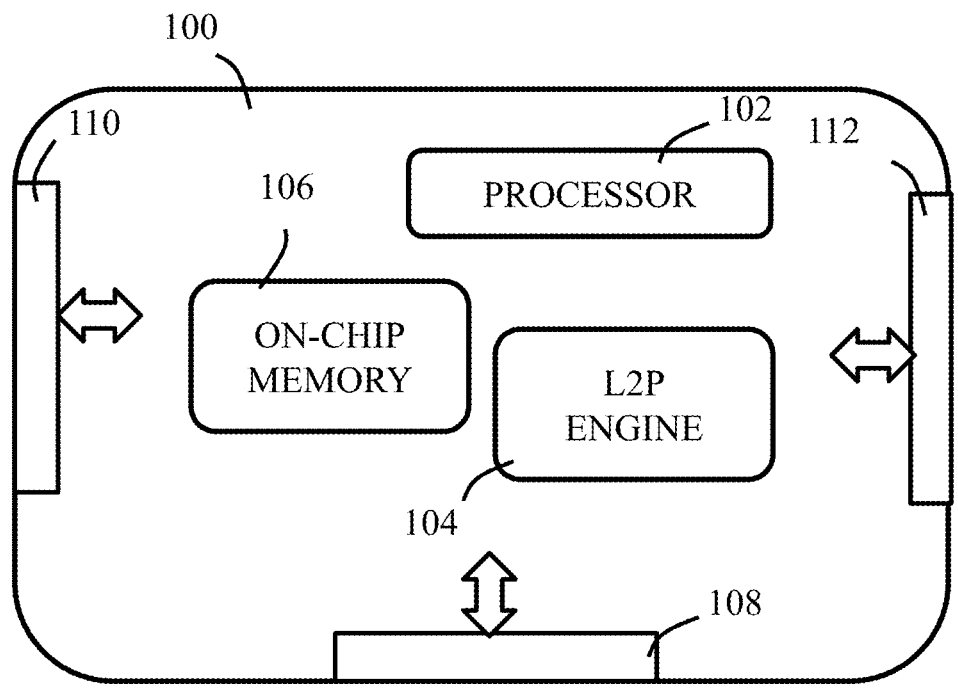
FIG. 1 schematically shows a non-volatile storage controller in accordance with an embodiment of the present disclosure.

Specific embodiments according to the present disclosure will now be described in detail with reference to the accompanying figures. Like elements in the various figures are denoted by like reference numerals for consistency.

The present disclosure provides apparatuses, systems and methods that support various high-speed non-volatile memory (NVM) devices and any combination of various NVM devices. As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

FIG. 1 schematically shows an exemplary non-volatile storage controller 100 according to an embodiment. The non-volatile storage controller 100 may comprise a first interface 110, a second interface 112, a third interface 108, a microcontroller unit (MCU) 102, an on-chip memory 106 and a logical-to-physical (L2P) engine 104. The first interface 110 may be any existing or yet to be developed interface that is configured to couple the non-volatile storage controller 100 to a system bus of a host computing system, and receive data from and transmit data to the host computing system. In one embodiment, for example, the first interface 110 may be a Peripheral Component Interconnect Express (PCIE) interface. The second interface 112 may be any existing or yet to be developed interface that is configured to couple the storage controller 100 to one or more non-volatile storage memory (NVM) devices. In one embodiment, the second interface 112 may be a multi-channel interface that may be configured to transfer encoded data (e.g., ECC codewords) over multiple channels in parallel. For example, the second interface 112 may be an Open NAND Flash Interface (ONFI) that may support different protocols (e.g., Non-volatile Double Data Rate (NVDDR), NVDDR Type 2 (NVDDR2,) NVDDR Type Three (NVDDR3)), or may be Toggle protocols and run at different transfer speeds. The third interface 108 may be any existing or yet to be developed interface (e.g., Double Data Rate (DDR), DDR Type 2 (DDR2), or DDR Type Three (DDR3)) that is configured to couple the storage controller 100 to an off-chip memory, for example, a dynamic random-access memory (DRAM).

The MCU 102 may be a computer processor configured to execute executable instructions (e.g., software or firmware). In various embodiments, the MCU 102 may be a microprocessor, a microcontroller, a field-programmable gate array (FPGA), or an application-specific IC (ASIC). The non-volatile storage controller 100 may receive commands from the host via the first interface 110, for example, to store data to the non-volatile storage system (e.g., a write command) or to read data stored in the non-volatile storage system (e.g., a read command). The commands from the host may use the logical block address (LBA) and the non-volatile storage devices may use the physical block address (PBA). LBA needs to be translated to the physical block address (PBA) at the storage controller 100. This L2P address translation may be processed by using a L2P address translation table, each entry of which may be the PBA used to store the data. In one embodiment, the non-volatile storage controller 100 may process the data in terms of a data unit (DU). The LBA for a data unit may be a logical data unit address (LDA) and the PBA for a data unit may be a physical data unit address (PDA).

The L2P address translation table may be stored in a non-volatile storage device coupled to the second interface 112. When the non-volatile storage system powers on, instead of loading the whole L2P address translation table, a subset of entries of the L2P address translation table may be loaded into the memory space of the non-volatile storage controller 100 (e.g., the on-chip memory 106 or an off-chip memory coupled to the controller 100). The subset of entries of the L2P address translation table may also be referred to as a partial L2P address translation table. In some embodiments, a lookup directory may be used to keep track of which translation data unit (TDU) has been loaded into the memory space of the controller 100. A TDU may be loaded into any available TDU space in the memory space and a corresponding entry in the lookup directory may contain the memory location of the TDU.

The L2P engine 104 may be configured to manage the partial L2P address translation table, for example, maintain a cache of recently accessed lookup directory entries, generate and manage cache misses, determine whether a TDU may need to be loaded from the L2P address translation table stored in the non-volatile storage device and reserve the memory space for this TDU, whether any loaded TDU has been updated and whether an updated TDU may need to be flushed to the L2P address translation table in the non-volatile storage device.

Figure 2:
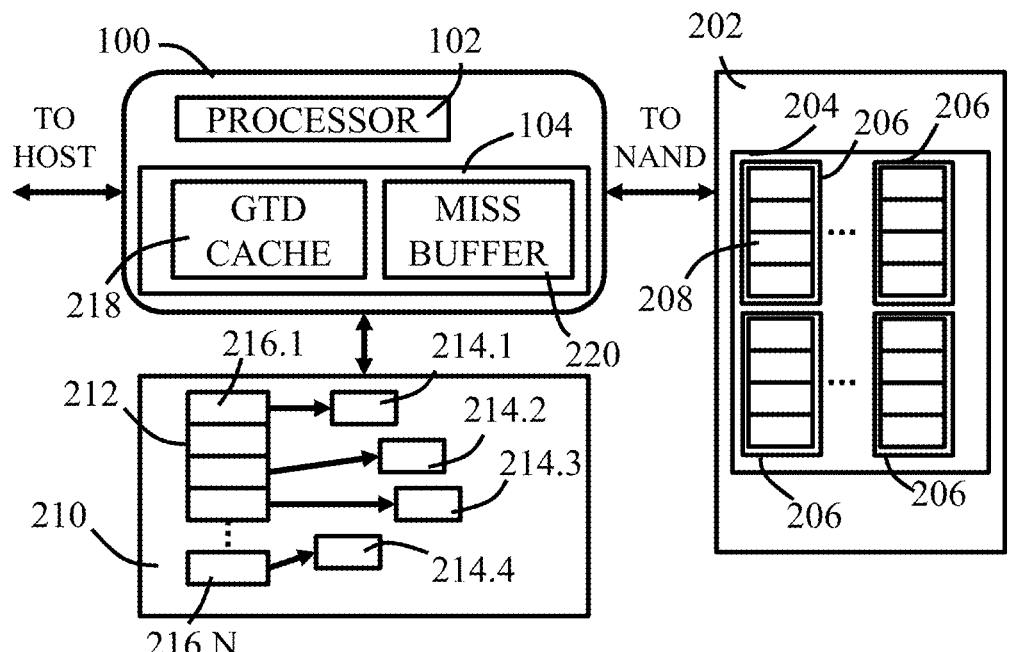
FIG. 2 schematically shows using a partial logical-to-physical address translation table to perform L2P translation in accordance with an embodiment of the present disclosure.

FIG. 2 schematically shows using a partial logical-to-physical address translation table to perform L2P translation in accordance with an embodiment of the present disclosure. A full L2P address translation table 204 may be stored in a non-volatile storage device 202 coupled to the non-volatile storage controller 100 (e.g., via the second interface 112). The L2P address translation table 204 may be stored in a plurality of NVM pages. Each of the NVM page used to store entries of the L2P table 204 may be referred to as a translation page (TP). As shown in FIG. 2, the L2P table 204 may comprise a plurality of TPs 206. A data unit (DU) used to store entries of the L2P table may be referred to as a translation DU (TDU). Each TP 206 may comprise a plurality of TDUs. One representative TDU 208 is labeled in FIG. 2.

In one embodiment, if a PDA is 4-Byte, a 16-KibiByte (KiB) TP may store 4096 L2P entries. If a 16-KiB TP contains four TDUs, each TDU may have 1024 L2P entries. A TP index may be used as an identifier to identify a TP and calculated by dividing the LDA with the number of L2P entries in the TP. For example, assuming in one embodiment the LDA may be 32 bits, for a 16-KiB TP with 4096 L2P entries, the TP index may be set to equal to the most significant 20 bits of the LDA, which may be represented as LDA[31:12]. Similarly, for a 4-KiB TDU with 1024 L2P entries, a TDU index be used as an identifier to identify a TDU and may be set to equal to the most significant 22 bits of the LDA, which may be represented as LDA[31:10].

As shown in FIG. 2, a lookup directory 212 may be maintained in a dynamic random-access memory (DRAM) 210 coupled to the non-volatile storage controller 100. Assume that the full L2P table 204 stored in the non-volatile storage device 202 may have a total of N TDUs, DRAM 210 may need to provide a space for M TDUs, in which both N and M may be positive integers and N may be much larger than M (e.g., M TDUs in the DRAM 210 being a subset of N TDUs of L2P table 204). The lookup directory 212 may have N entries (e.g., 216.1 through 216.N), which may match the number of all TDUs of the full L2P table 204. In one embodiment, the lookup directory 212 may be implemented as a global translation directory (GTD) and each entry of the lookup directory 212 may be referred to as a lookup directory entry or a GTD entry. The lookup directory 212 may keep track of which TDU has been loaded into DRAM 210 and the memory location of the loaded TDUs in the DRAM 210. Every time when a TDU is loaded from the non-volatile storage device 202 to DRAM 210 or flushed from DRAM 210 to the non-volatile storage device 202, the corresponding GTD entry may be updated. By using the lookup directory 212, one TDU may be loaded into any available TDU space in the DRAM 210.

Figure 3A:
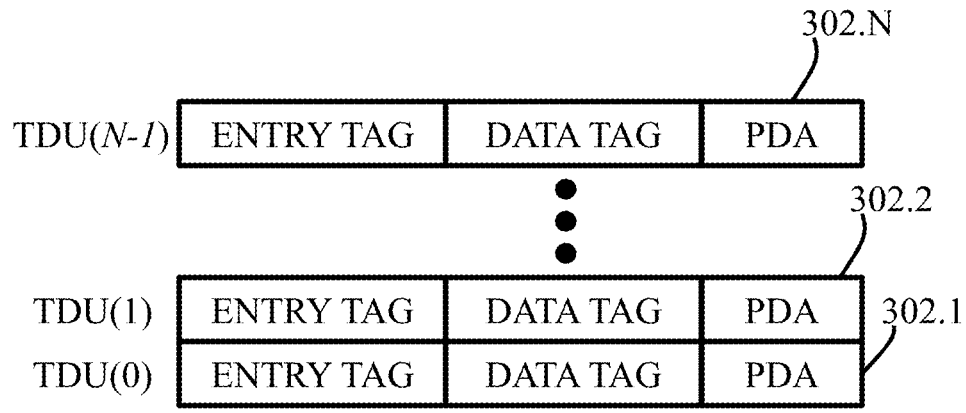
FIG. 3A schematically shows a plurality of entries for a lookup directory in accordance with an embodiment of the present disclosure.

FIG. 3A schematically shows a plurality of entries 302.1 through 302.N for a lookup directory in accordance with an embodiment of the present disclosure. The lookup directory may be implemented as a global translation directory (GTD) in one embodiment. Each of the lookup directory entries 302.1 through 302.N may be identified by a TDU index TDU(i) with "i" being any one of zero to N−1, and each of the lookup directory entries 302.1 through 302.N may comprise three fields. The first field may be an entry tag. The second field may be a data tag, which may be a memory address pointing to the DRAM location in the DRAM 210 used to store the TDU. The third part may be the PDA of TDU (e.g., the location of where the TDU is stored in the non-volatile storage device 202).

Figure 3B:
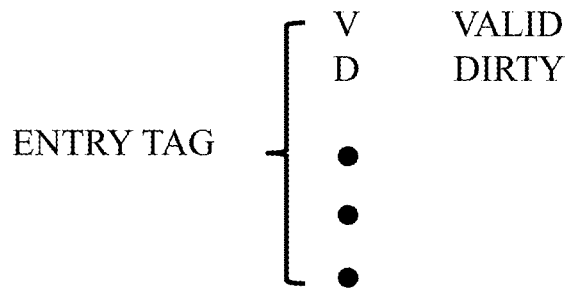
FIG. 3B schematically shows an entry tag for a lookup directory entry in accordance with an embodiment of the present disclosure.

FIG. 3B schematically shows an entry tag for a lookup directory entry in accordance with an embodiment of the present disclosure. The entry tag may comprise a plurality of bits. At a minimum, the entry tag may include a validity bit and a dirty bit. The validity bit may be used to indicate whether the TDU has been loaded into the DRAM. For example, if a TDU is already loaded into the DRAM 210, its corresponding lookup directory entry is valid and the validity bit may be 1; and if a TDU is not in the DRAM 210, its corresponding lookup directory entry is invalid and the validity bit may be 0. The dirty bit may be used to indicate whether the TDU in the DRAM 210 is dirty (e.g., containing one or more modified L2P entries and being different from the TDU in the non-volatile storage device 202). For example, if a TDU in the DRAM 210 is dirty, it may need to be flushed to the non-volatile storage device 202 to update the full L2P address translation table 204. In some embodiments, the entry tag may include one or more other bits in addition to the validity bit and dirty bit.

Referring back to FIG. 2, the L2P engine 104 may comprise a GTD cache 218 and a miss buffer 220. The GTD cache 218 may be used to store recently accessed GTD entries and the miss buffer 220 may be used to track cache misses for GTD entries. In one embodiment, the cache misses may be stored as outstanding requests for GTD entries (e.g., load requests and update requests). When the storage controller 100 receives a command (e.g., read or write) with LDA i from a host with "i" being a valid number for LDA (e.g., a 32-bit number for a 32-bit address), a search request for the translation entry for LDA i may be sent from the processor 102 to the L2P engine 104. The TDU index for this LDA i may be calculated (e.g., obtaining LDA i [31: 10]). The GTD cache 218 may be checked for this TDU(i). If the GTD entry for TDU(i) is found in the GTD cache 218, data tag in the cached GTD entry may be used to locate the L2P entry for LDA i and the physical address for LDA i may be obtained from the L2P entry and the command may be performed accordingly.

If the GTD entry for TDU(i) is not found in the GTD cache, an outstanding request for the GTD entry for TDU(i) may be generated and maintained in the miss buffer 220. The outstanding request for the GTD entry for TDU(i) may include LDA i (e.g., just the least significant 10 bits because TDU index has the most significant 22 bits) and the operation to be performed for LDA i (e.g., search or update). The L2P engine 104 may then send a GTD entry fetch request with TDU(i) to DRAM 210 and retrieve the GTD entry for TDU(i) from DRAM 210. If the retrieved GTD entry is valid (e.g., the validity bit being 1 in the entry tag), the retrieved GTD entry may be inserted into the GTD cache 218 and the outstanding request in the miss buffer 220 may be serviced and cleared. For valid GTD entries in the GTD 212, the corresponding TDUs are already loaded in the DRAM 210. For example, TDUs 214.1, 214.2, 214.3 and 214.4 are already loaded in the DRAM 210. If the retrieved GTD entry is invalid (e.g., the validity bit being 0 in the entry tag), this TDU(i) is not in the DRAM 210. A TDU space for TDU(i) may be reserved in the DRAM 210 and a load request for TDU(i) may be sent to the non-volatile storage device 202. To reduce the overhead of loading TDU(i), the outstanding request for the GTD entry for TDU(i) may be maintained in the miss buffer 220 while the load request is being serviced.

In one embodiment, the miss buffer 220 may contain one or more miss status holding registers (MSHRs). The miss buffer 220 may handle multiple load requests for the GTD entry for the same TDU or GTD entries for different TDUs and reduce the TDU load overhead caused by the use of partial L2P address translation table. In one embodiment, the miss buffer 220 may be used to keep track of all outstanding requests for GTD entries for multiple TDUs, including outstanding requests generated for fetching GTD entries from the DRAM 210 and any subsequent requests to the GTD entries while the GTD entries are being fetched from the DRAM 210 or TDUs are being loaded from the non-volatile storage device 202 to the DRAM 210.

Figure 4:
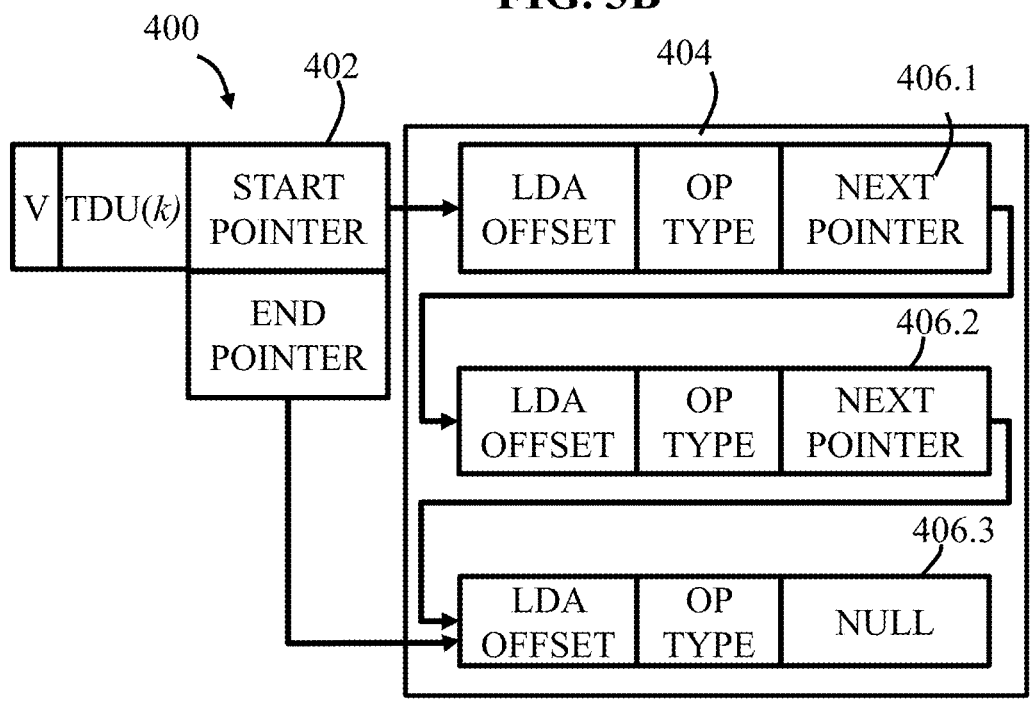
FIG. 4 schematically shows an entry of miss status holding registers in accordance with an embodiment of the present disclosure.

FIG. 4 schematically shows a MSHR 400 in accordance with an embodiment of the present disclosure. The exemplary MSHR 400 may comprise a head portion 402 and a list portion 404. The head portion 402 may contain a validity bit, the tag of the MSHR (e.g., the TDU index TDU(k) identifying the TDU of a cache miss), a start pointer pointing to a first entry in the list portion 404 and an end pointer pointing to the last entry in the list portion 404. The validity bit may indicate whether the MSHR is still valid. The list portion 404 may comprise one or more list entries (e.g., 406.1 through 406.3) in a linked list when the validity bit indicates this MSHR is valid (e.g., set to one when one or more cache misses occurred for the TDU index TDU(k)). An invalid MSHR does not have the list portion 404. Each of the list entry may comprise an LDA offset, an operation type and a pointer to the next entry in the linked list. In one embodiment, the LDA offset may be the least significant 10 bits of the LDA (while the most significant 22 bits of the 32-bit LDA serves as the TDU index in the head portion 402). The last entry in the linked list may have a "NULL" pointer for the next entry because there is no entry after the last entry. In one embodiment, the miss buffer 220 may comprise a plurality of MSHRs 400. These MSHRs may be initialized with the validity bit set to non-valid, tags set to zero, start and end pointers set to NULL.

In general, there may be one outstanding request for the GTD entry for a TDU or a plurality of outstanding requests for the GTD entry for the same TDU. For example, a LDA m (e.g., m being a 32-bit address) may have a L2P translation entry in a particular TDU so that one data access command with the address of LDA m may cause a first outstanding request for the GTD entry for the TDU be generated and maintained in the miss buffer. The particular TDU may have a plurality of translation entries (e.g., 1024 entries for 1024 LDAs) and any additional access request to the same L2P entry or another L2P entry in the particular TDU may cause a second or additional outstanding requests for the GTD entry for the TDU to be generated and stored in the linked list for the GTD entry for the particular TDU. The LDA offset may indicate which LDA (e.g., of 1024 entries in the range covered by the TDU) needed the translation and the operation type may indicate what kind of operation (e.g., search or update) for the L2P entry.

Figure 5:
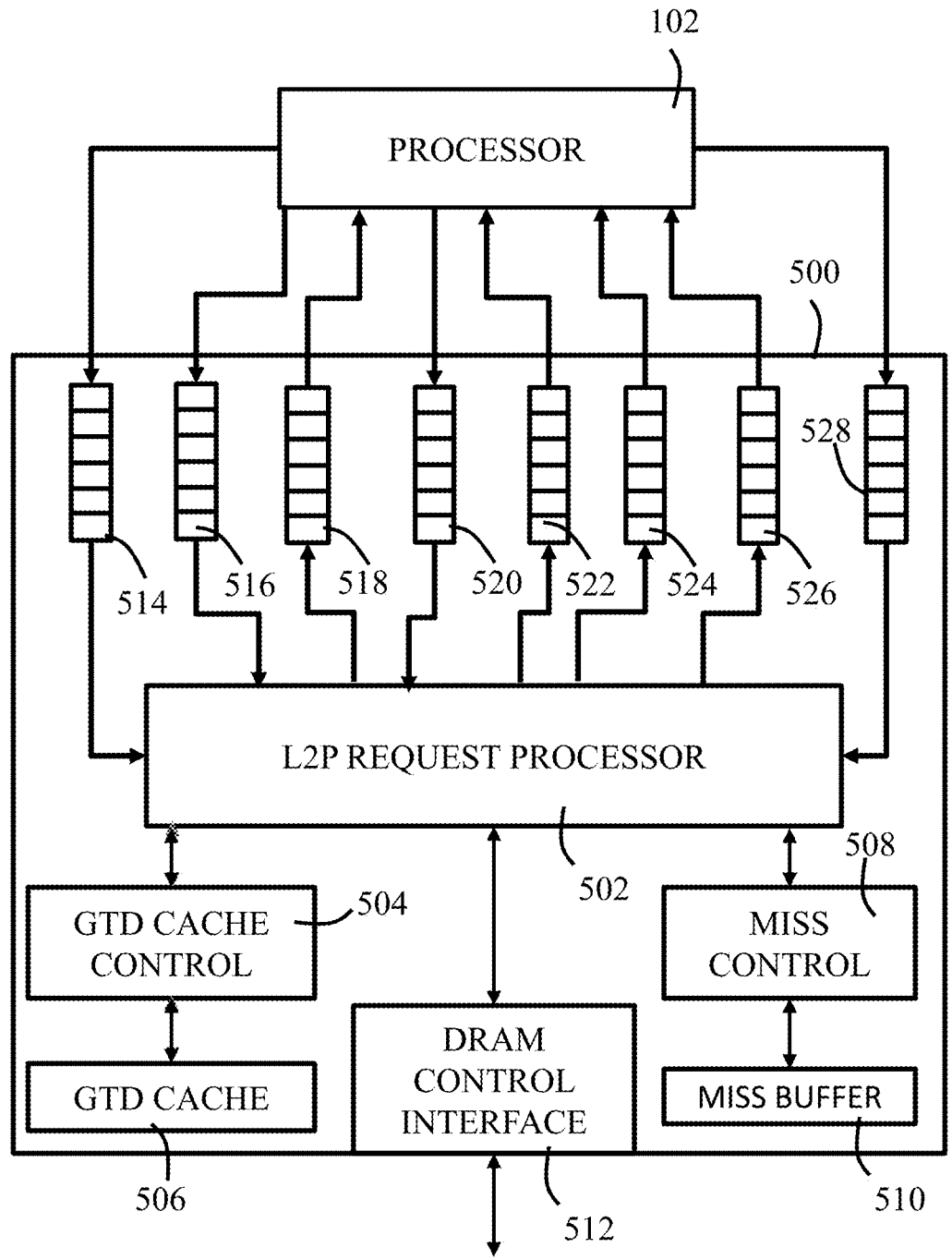
FIG. 5 schematically shows a L2P engine in in accordance with an embodiment of the present disclosure.

FIG. 5 schematically shows a L2P engine 500 in accordance with an embodiment of the present disclosure. The L2P engine 500 may be an embodiment of the L2P engine 104 in FIG. 1. The L2P engine 500 may comprise a L2P request processor 502, a GTD cache control block 504, a GTD cache 506, a miss control block 508, a miss buffer 510, a DRAM control interface 512 and a plurality of queues for communication with the processor 102. The plurality of queues may include a L2P search request queue 514, a L2P update request queue 516, a TDU load request queue 518, a TDU load completion queue 520, a L2P search result queue 522, a L2P update result queue 524, a TDU flush request queue 526 and a TDU flush completion queue 528. The GTD cache 506 may be an embodiment of the GTD cache 218 in FIG. 2 and the miss buffer 510 may be an embodiment of the miss buffer 220 in FIG. 2.

The L2P engine 500 may receive L2P requests from the processor 102. The L2P requests may include search requests and update requests. A search request may be a request to search for a L2P translation for a LDA, for example, LDA m, in which m may be a 32-bit address in one embodiment. An update request may be a request to update a L2P translation for a LDA. The L2P search request queue 514 and L2P update request queue 516 may be buffers to temporarily store the received search requests and update requests before the requests may be processed by the L2P request processor 502. In one embodiment, once a L2P request with a LDA is received (e.g., LDA m) and the TDU index for the LDA may be calculated (e.g., the most significant 22 bits of LDA m). The GTD cache 506 may be searched to determine whether the GTD entry identified by the TDU index is already in the GTD cache 506. If there is a hit, the GTD entry is already in the GTD cache and the data tag of the GTD entry may contain the memory location of the TDU. The TDU may include a plurality of L2P entries (e.g., 1024 entries) that includes the L2P entry for the LDA. If the L2P request is a L2P search request, the L2P entry may be fetched from the memory and returned to the processor 102. If the L2P request is a L2P update request, the L2P entry in the TDU in the DRAM 210 may be updated. In one embodiment, the L2P engine 500 may send the search request results to the L2P search result queue 522 and update request results to the L2P update result queue 524, and the processor 102 may receive the search request results from the L2P search result queue 522 and update request results from the L2P update result queue 524.

The L2P engine 500 may send TDU flush requests to the processor 102 and receive TDU flush completion notifications from the processor 102. For example, if a TDU in the DRAM 210 is dirty (e.g., the dirty bit being set), it may need to be flushed to the non-volatile storage device 202 to update the full L2P address translation table 204. In one embodiment, a TDU flush request may be generated and pushed into the TDU flush request queue 526. Once the TDU flush has been completed, the processor 102 may send a flush completion message to the TDU flush completion queue 528.

If the search of the GTD cache 506 has no hit, the miss buffer 510 may be searched to determine whether there is any outstanding request for the GTD entry identified by the TDU index (e.g., by searching for the TDU index in the head portion 402 of the MSHRs in the miss buffer 510). If there is any existing outstanding request for the GTD entry for the TDU, a MSHR with a linked-list for the GTD entry for the TDU already exists, a list entry for the LDA (e.g., a new outstanding request) may be created and inserted in this already existing MSHR, and the end pointer in head portion of the MSHR may be updated to point to the new outstanding request. If there is no outstanding request for the GTD entry for the TDU, a GTD entry fetch request with the TDU index may be sent (e.g., via the DRAM control interface 512) to the DRAM (e.g., DRAM 210), and also a MSHR may be allocated to the GTD entry with the TDU index inserted in the head portion of the MSHR. A new outstanding request for the LDA may be created and a linked-list may be created with the new outstanding request as the first entry. After the first entry of the linked list may be has been created, the start pointer and the end porter of the MSHR may both may point to the list entry just created.

It should be noted that when the miss buffer 510 is just initialized, all MSHRs of the miss buffer may have their respective TDU index set to zero, but the validity bit of these MSHRs may be set to invalid (e.g., zero) to indicate that there not no cache misses for the MSHRs.

After a GTD fetch request with the TDU index is sent to the DRAM 210, a GTD entry may be received from the DRAM 210 (e.g., from the GTD 212 in DRAM 210). When the GTD entry for the TDU identified by the TDU index is received by the L2P engine 500, the validity bit of the GTD entry may be checked to determine whether the GTD entry is valid. In one embodiment, after the lookup directory 212 is initialized in the DRAM 210, all entries may be invalid (e.g., the validity bit set to zero), and a GTD entry may become valid only after the corresponding TDU has been loaded from the L2P table 204. In the L2P engine 500, if the received GTD entry is not valid, the L2P engine 500 may determine that the TDU has not been loaded from the L2P table 204 and a load request for the TDU (e.g., identified by the TDU index) may be sent to the NAND interface controller after a TDU space for the TDU to be loaded is reserved in the memory (e.g., DRAM 210) of the storage controller. In some embodiments, the L2P engine may send a TDU load request to the processor 102. In one embodiment, the TDU load request may be pushed into the TDU load request queue 518 and retrieved and processed by the processor 102.

If the GTD entry received by the L2P engine 500 is valid, a MSHR in the miss buffer 510 corresponding to the GTD entry identified by this TDU index (e.g., having this TDU index in its head portion) may be processed by going over all entries in the request linked-list in this MSHR's list portion. For example, using the data tag in the just received GTD entry to get the memory location of the TDU and carrying out the operation specified in the op type field for each linked-list entry for the LDA offset in the linked-list entry (e.g., performing the operation on the L2P entry, such as, search or update the L2P entry). Once all entries of the linked-list have been processed, the linked list may be removed and the MSHR's head portion may be cleared. For example, the TDU index may be removed from MSHR's head portion, the validity bit may be set to not valid (e.g., zero) and the start pointer and end pointer may be set to NULL. Also, the GTD entry may inserted into the GTD cache 506. In one embodiment, the GTD cache control 504 may be configured to insert the GTD entry into the GTD cache 506 and the miss control 508 may be configured to process the MSHR in the miss buffer for the GTD entry.

When a requested TDU has been successfully loaded into the DRAM 210, a TDU load completion message may be sent to the L2P engine 500. In one embodiment, a load completion message may be received in the TDU load completion queue 520 from the processor 102. The TDU load completion message may comprise the TDU index and memory location of the TDU (e.g., the data tag in a GTD entry). The L2P engine 500 may process the TDU load completion message similar to processing a valid GTD entry retrieved from the lookup directory 212. For example, a MSHR in the miss buffer 510 corresponding to this TDU load completion (e.g., having this TDU index in its head portion) may be processed by going over all entries in the request linked-list in this MSHR's list portion. Once all entries of the linked-list have been processed, the linked list may be removed and the MSHR's head portion may be cleared. The L2P engine 500 may update the GTD entry for this TDU in the lookup directory 212 (e.g., via the DRAM control interface 512) and update the GTD cache 506 (e.g., insert this GTD entry by the GTD cache control 504).

Figure 6:
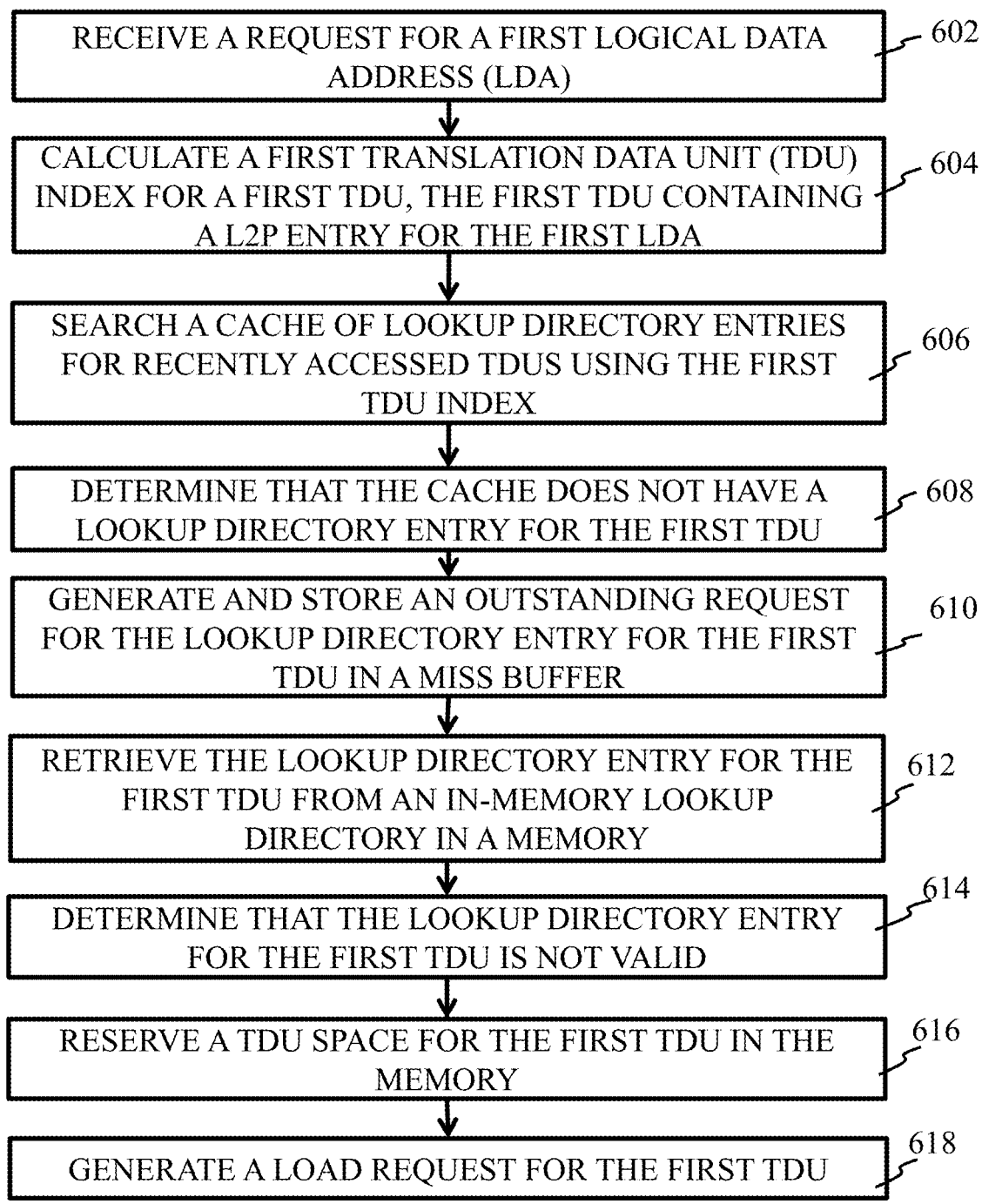
FIG. 6 is a flowchart of a process for using a partial L2P address translation table in accordance with an embodiment of the present disclosure.

FIG. 6 is a flowchart of a process 600 for using a partial L2P translation table in accordance with an embodiment of the present disclosure. At block 602, a request for a first logical data address (LDA) may be received. For example, a search request or update request for a LDA may be received by the L2P engine 104. At block 604, a first translation data unit (TDU) index for a first TDU may be calculated. The first TDU may contain a L2P entry for the first LDA. In one embodiment, a TDU may contain 1024 L2P entries that includes the L2P for the first LDA. At block 606, a cache of lookup directory entries may be searched using the first TDU index. The cache (e.g., GTD cache 506) may contain memory locations of recently accessed TDUs. For example, the GTD entries in the cache 506 may have the memory locations of TDUs in respective entries' data tags.

At block 608, it may be determined that the cache does not have a lookup directory entry (e.g., a GTD entry) for the first TDU and at block 610, an outstanding request for the lookup directory entry for the first TDU may be generated and stored in a miss buffer. For example, searching the cache for a TDU index may result in no hit. Accordingly, an outstanding request may be generated and stored for the cache miss. At block 612, a lookup directory entry for the first TDU may be retrieved from an in-memory lookup directory in a memory. For example, the lookup directory 212 in the DRAM 210 may be an in-memory lookup directory that may contain entries for all TDUs in the L2P translation table and a first-time cache miss for the lookup directory entry for a TDU may cause the lookup director entry for the TDU be fetched from the DRAM 210. At block 614, it may be determined that the lookup directory entry for the first TDU is not valid. At block 616, a TDU space may be reserved for the first TDU in the memory and at block 618, a load request for the first TDU may be generated. For example, after the lookup director 212 is initialized, all entries may be invalid and the corresponding TDU may need to be loaded from the L2P table stored in the non-volatile storage device 202. A TDU space may need to be reserved in the memory (e.g., DRAM 210) for the TDU to be loaded and the TDU load request may be pushed into the TDU load request queue 518.

In various embodiments, the process 600 and the L2P engine 104 (or L2P engine 500) may have one or more portions or in its entirety be implemented using hardware (e.g., a field-programmable gate array (FPGA) or an application-specific IC (ASIC)), firmware, a computer processor executing software instructions, or any suitable combination. If the L2P engine 104 (or L2P engine 500) is implemented in software, the storage units (e.g., queues, cache and miss buffer) may be implemented in the on-chip memory 106 or off-chip memory (e.g., DRAM 210). Moreover, the lookup directory 212 may be stored in the on-chip memory 106 in at least one embodiment.

In some embodiments, high throughput for a non-volatile storage system is not critical, the use of partial L2P translation table in the memory (e.g., SRAM or DRAM) may be a good balance among cost, area and throughput of the non-volatile storage system.

Embodiments of the present disclosure may use a partial logical-to-physical address translation table in storage controllers to reduce the memory space used for logical-to-physical address translation in storage controllers. A subset of a full L2P address translation table may be loaded into the memory of a storage controller. A lookup directory with number of entries matching the number of entries of TDUs of a full L2P address translation table may be maintained in the memory of the storage controller. The lookup directory may keep track of which TDU may have been loaded into the memory space of the storage controllers.

Every time when a TDU is loaded from a non-volatile storage device to the memory of the storage controller or flushed from the memory of the storage controller to the non-volatile storage device, the corresponding lookup directory entry may be updated. One TDU may be loaded into any available TDU space in the memory of the storage controller and the lookup directory may keep track of where in the memory the TDU is loaded into. If the lookup directory entry for a TDU is invalid, it means that this TDU is not in the memory of the storage controller and a load request for this TDU may be sent to non-volatile storage device.

In some embodiments, the recently accessed lookup directory entries may be maintained in a cache and the cache may be checked first to determine whether the lookup directory entry corresponding to a TDU is available in the cache. Cache misses may be tracked in a miss buffer (e.g., a miss status holding register (MSHR)). The miss buffer may handle multiple cache misses for requests to the lookup directory entry for the same TDU or to the lookup directory entries for different TDUs and reduce the TDU load overhead caused by the use of partial L2P address table.

In an exemplary embodiment, there is provided a method that may comprise: receiving a request for a first logical data address (LDA); calculating a first translation data unit (TDU) index for a first TDU, the first TDU containing a logical-to-physical (L2P) entry for the first LDA; searching a cache of lookup directory entries of recently accessed TDUs using the first TDU index; determining that the cache does not have a lookup directory entry for the first TDU; generating and storing an outstanding request for the lookup directory entry for the first TDU in a miss buffer; retrieving the lookup directory entry for the first TDU from an in-memory lookup directory in a memory; determining that the lookup directory entry for the first TDU is not valid; reserving a TDU space for the first TDU in the memory; and generating a load request for the first TDU.

In an embodiment, generating and storing the outstanding request for the lookup directory entry for the first TDU in the miss buffer may further comprise determining that this is a first cache miss for the lookup directory entry for the first TDU, adding the first TDU index to a miss status holding register (MSHR), and creating a request linked list for the MSHR with the outstanding request for the lookup directory entry for the first TDU as a first list entry of the request linked list.

In an embodiment, generating and storing the outstanding request for the lookup directory entry for the first TDU in the miss buffer may further comprise determining that there is a request linked list for the lookup directory entry for the first TDU in a miss status holding register (MSHR), inserting the outstanding request into the request linked list and updating an end pointer in the MSHR.

In an embodiment, the first TDU index may be calculated by dividing the first LDA by a total number of L2P entries in the first TDU.

In an embodiment, the method may further comprise: retrieving a lookup directory entry for a second TDU from the in-memory lookup directory; determining that the lookup directory entry for the second TDU is valid; processing all outstanding request(s) for the lookup directory entry for the second TDU in the miss buffer; and updating the cache of lookup directory entries with the lookup directory entry for the second TDU.

In an embodiment, processing all outstanding request(s) for the lookup directory entry for the second TDU in the miss buffer may further comprise processing all outstanding request(s) in a request linked list for the lookup directory entry for the second TDU in a miss status holding register (MSHR), releasing the request linked list and clearing the MSHR.

In an embodiment, the method may further comprise: receiving a TDU load completion message for the first TDU; processing the outstanding request for the lookup directory entry for the first TDU in the miss buffer; updating the lookup directory entry for the first TDU in the in-memory lookup directory with a memory location of the first TDU; and updating the lookup directory entry for the first TDU in the cache of lookup directory entries with the memory location of the first TDU.

In another exemplary embodiment, there is provided an apparatus that may comprise: a processor, and a logical-to-physical (L2P) translation engine. The L2P translation engine may comprise a cache of lookup directory entries of recently accessed translation data units (TDUs) and a miss buffer. And the L2P translation engine may be configured to: receive a request for a first logical data address (LDA) from the processor; calculate a first TDU index for a first TDU, the first TDU containing a L2P entry for the first LDA; search the cache of lookup directory entries of recently accessed TDUs using the first TDU index; determine that the cache does not have a lookup directory entry for the first TDU; generate and store an outstanding request for the lookup directory entry for the first TDU in the miss buffer; retrieve the lookup directory entry for the first TDU from an in-memory lookup directory in a memory coupled to the apparatus; determine that the lookup directory entry for the first TDU is not valid; reserve a TDU space for the first TDU in the memory and generate a load request for the first TDU.

In an embodiment, to generate and store the outstanding request for the lookup directory entry for the first TDU in the miss buffer, the L2P translation engine may be further configured to: determine that this is a first cache miss for the lookup directory entry for the first TDU, add the first TDU index to a miss status holding register (MSHR), and create a request linked list for the MSHR with the outstanding request for the lookup directory entry for the first TDU as a first list entry of the request linked list.

In an embodiment, to generate and store the outstanding request for the lookup directory entry for the first TDU in the miss buffer, the L2P translation engine may be further configured to: determine that there is a request linked list for the lookup directory entry for the first TDU in a miss status holding register (MSHR), insert the outstanding request into the request linked list and update an end pointer in the MSHR.

In an embodiment, the first TDU index may be calculated by dividing the first LDA by a total number of L2P entries in the first TDU.

In an embodiment, the L2P translation engine may be further configured to: retrieve a lookup directory entry for a second TDU from the in-memory lookup directory; determine that the lookup directory entry for the second TDU is valid; process all outstanding request(s) for the lookup directory entry for the second TDU in the miss buffer; and update the cache of lookup directory entries with the lookup directory entry for the second TDU.

In an embodiment, to process all outstanding request(s) for the lookup directory entry for the second TDU in the miss buffer, the L2P translation engine may be further configured to process all outstanding request(s) in a request linked list for the lookup directory entry for the second TDU in a miss status holding register (MSHR), release the request linked list and clear the MSHR.

In an embodiment, the L2P translation engine may be further configured to: receive a TDU load completion message for the first TDU; process the outstanding request for the lookup directory entry for the first TDU in the miss buffer; update the lookup directory entry for the first TDU in the in-memory lookup directory with a memory location of the first TDU; and update the lookup directory entry for the first TDU in the cache of lookup directory entries with the memory location of the first TDU.

In yet another exemplary embodiment, disclosed herein may also include a non-transitory machine-readable medium having executable instructions, that the executable instructions, when executed by a storage controller, may cause the storage controller to: receive a request for a first logical data address (LDA); calculate a first translation data unit (TDU) index for a first TDU, the first TDU containing a logical-to-physical (L2P) entry for the first LDA; search a cache of lookup directory entries of recently accessed TDUs using the first TDU index; determine that the cache does not have a lookup directory entry for the first TDU; generate and storing an outstanding request for the lookup directory entry for the first TDU in a miss buffer; retrieve the lookup directory entry for the first TDU from an in-memory lookup directory in a memory coupled to the storage controller; determine that the lookup directory entry for the first TDU is not valid; reserve a TDU space for the first TDU in the memory and generate a load request for the first TDU.

In an embodiment, to generate and store the outstanding request for the lookup directory entry for the first TDU in the miss buffer, the executable instructions, when executed by the storage controller, may further cause the storage controller to: determine this is a first cache miss for the lookup directory entry for the first TDU, add the first TDU index to a miss status holding register (MSHR), and create a request linked list for the MSHR with the outstanding request for the lookup directory entry for the first TDU as a first list entry of the request linked list.

In an embodiment, to generate and store the outstanding request for the lookup directory entry for the first TDU in the miss buffer, the executable instructions, when executed by the storage controller, may further cause the storage controller to: determine that there is a request linked list for the lookup directory entry for the first TDU in a miss status holding register (MSHR), insert the outstanding request into the request linked list and update an end pointer in the MSHR.

In an embodiment, the first TDU index may be calculated by dividing the first LDA by a total number of L2P entries in the first TDU.

In an embodiment, the executable instructions, when executed by the storage controller, may further cause the storage controller to: retrieve a lookup directory entry for a second TDU from the in-memory lookup directory; determine that the lookup directory entry for the second TDU is valid; process all outstanding request(s) for the lookup directory entry for the second TDU in the miss buffer; and update the cache of lookup directory entries with the lookup directory entry for the second TDU.

In an embodiment, to process all outstanding request(s) for the lookup directory entry for the second TDU in the miss buffer, the executable instructions, when executed by the storage controller, may further cause the storage controller to: process all outstanding request(s) in a request linked list for the lookup directory entry for the second TDU in a miss status holding register (MSHR), release the request linked list and clear the MSHR.

In an embodiment, the executable instructions, when executed by the storage controller, may further cause the storage controller to: receive a TDU load completion message for the first TDU; process the outstanding request for the lookup directory entry for the first TDU in the miss buffer; update the lookup directory entry for the first TDU in the in-memory lookup directory with a memory location of the first TDU; and update the lookup directory entry for the first TDU in the cache of lookup directory entries with the memory location of the first TDU.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as SSD hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    receiving a request for a first logical data address (LDA);
    calculating a first translation data unit (TDU) index for a first TDU, the first TDU containing a logical-to-physical (L2P) entry for the first LDA;
    searching a cache of lookup directory entries of recently accessed TDUs using the first TDU index;
    determining that the cache does not have a lookup directory entry for the first TDU;
    generating and storing an outstanding request for the lookup directory entry for the first TDU in a miss buffer;
    retrieving the lookup directory entry for the first TDU from an in-memory lookup directory in a memory;
    determining that the lookup directory entry for the first TDU is not valid;
    reserving a TDU space for the first TDU in the memory;
    generating a load request for the first TDU;
    receiving a TDU load completion message for the first TDU;
    processing the outstanding request for the lookup directory entry for the first TDU in the miss buffer;
    updating the lookup directory entry for the first TDU in the in-memory lookup directory with a memory location of the first TDU; and
    updating the lookup directory entry for the first TDU in the cache of lookup directory entries with the memory location of the first TDU.

2. The method of claim 1, wherein generating and storing the outstanding request for the lookup directory entry for the first TDU in the miss buffer further comprises determining that this is a first cache miss for the lookup directory entry for the first TDU, adding the first TDU index to a miss status holding register (MSHR), and creating a request linked list for the MSHR with the outstanding request for the lookup directory entry for the first TDU as a first list entry of the request linked list.

3. The method of claim 1, wherein generating and storing the outstanding request for the lookup directory entry for the first TDU in the miss buffer further comprises determining that there is a request linked list for the lookup directory entry for the first TDU in a miss status holding register (MSHR), inserting the outstanding request into the request linked list and updating an end pointer in the MSHR.

4. The method of claim 1, wherein the first TDU index is calculated by dividing the first LDA by a total number of L2P entries in the first TDU.

5. The method of claim 1, further comprising:
    retrieving a lookup directory entry for a second TDU from the in-memory lookup directory;
    determining that the lookup directory entry for the second TDU is valid;
    processing all outstanding request(s) for the lookup directory entry for the second TDU in the miss buffer; and
    updating the cache of lookup directory entries with the lookup directory entry for the second TDU.

6. The method of claim 5, wherein processing all outstanding request(s) for the lookup directory entry for the second TDU in the miss buffer comprises processing all outstanding request(s) in a request linked list for the lookup directory entry for the second TDU in a miss status holding register (MSHR), releasing the request linked list and clearing the MSHR.

7. An apparatus, comprising:
a processor, and
a logical-to-physical (L2P) translation engine comprising a cache of lookup directory entries of recently accessed translation data units (TDUs) and a miss buffer, the L2P translation engine configured to:
  receive a request for a first logical data address (LDA) from the processor;
  calculate a first TDU index for a first TDU, the first TDU containing a L2P entry for the first LDA;
  search the cache of lookup directory entries of recently accessed TDUs using the first TDU index;
  determine that the cache does not have a lookup directory entry for the first TDU;
  generate and store an outstanding request for the lookup directory entry for the first TDU in the miss buffer;
  retrieve the lookup directory entry for the first TDU from an in-memory lookup directory in a memory coupled to the apparatus;
  determine that the lookup directory entry for the first TDU is not valid;
  reserve a TDU space for the first TDU in the memory;
  generate a load request for the first TDU;
  receive a TDU load completion message for the first TDU;
  process the outstanding request for the lookup directory entry for the first TDU in the miss buffer;
  update the lookup directory entry for the first TDU in the in-memory lookup directory with a memory location of the first TDU; and
  update the lookup directory entry for the first TDU in the cache of lookup directory entries with the memory location of the first TDU.

8. The apparatus of claim 7, wherein, to generate and store the outstanding request for the lookup directory entry for the first TDU in the miss buffer, the L2P translation engine is further configured to: determine that this is a first cache miss for the lookup directory entry for the first TDU, add the first TDU index to a miss status holding register (MSHR), and create a request linked list for the MSHR with the outstanding request for the first TDU as a first list entry of the request linked list.

9. The apparatus of claim 7, wherein, to generate and store the outstanding request for the lookup directory entry for the first TDU in the miss buffer, the L2P translation engine is further configured to: determine that there is a request linked list for the lookup directory entry for the first TDU in a miss status holding register (MSHR), insert the outstanding request into the request linked list and update an end pointer in the MSHR.

10. The apparatus of claim 7, wherein the first TDU index is calculated by dividing the first LDA by a total number of L2P entries in the first TDU.

11. The apparatus of claim 7, wherein the L2P translation engine is further configured to:
  retrieve a lookup directory entry for a second TDU from the in-memory lookup directory;
  determine that the lookup directory entry for the second TDU is valid;
  process all outstanding request(s) for the lookup directory entry for the second TDU in the miss buffer; and
  update the cache of lookup directory entries with the lookup directory entry for the second TDU.

12. The apparatus of claim 11, wherein, to process all outstanding request(s) for the lookup directory entry for the second TDU in the miss buffer, the L2P translation engine is further configured to process all outstanding request(s) in a request linked list for the lookup directory entry for the second TDU in a miss status holding register (MSHR), release the request linked list and clear the MSHR.

13. A non-transitory machine-readable medium having executable instructions, wherein the executable instructions, when executed by a storage controller, causes the storage controller to:
  receive a request for a first logical data address (LDA);
  calculate a first translation data unit (TDU) index for a first TDU, the first TDU containing a logical-to-physical (L2P) entry for the first LDA;
  search a cache of lookup directory entries of recently accessed TDUs using the first TDU index;
  determine that the cache does not have a lookup directory entry for the first TDU;
  generate and storing an outstanding request for the lookup directory entry for the first TDU in a miss buffer;
  retrieve the lookup directory entry for the first TDU from an in-memory lookup directory in a memory coupled to the storage controller;
  determine that the lookup directory entry for the first TDU is not valid;
  reserve a TDU space for the first TDU in the memory;
  generate a load request for the first TDU;
  receive a TDU load completion message for the first TDU;
  process the outstanding request for the lookup directory entry for the first TDU in the miss buffer;
  update the lookup directory entry for the first TDU in the in-memory lookup directory with a memory location of the first TDU; and
  update the lookup directory entry for the first TDU in the cache of lookup directory entries with the memory location of the first TDU.

14. The non-transitory machine-readable medium of claim 13, wherein, to generate and store the outstanding request for the lookup directory entry for the first TDU in the miss buffer, the executable instructions, when executed by the storage controller, further causes the storage controller to: determine this is a first cache miss for the lookup directory entry for the first TDU, add the first TDU index to a miss status holding register (MSHR), and create a request linked list for the MSHR with the outstanding request for the lookup directory entry for the first TDU as a first list entry of the request linked list.

15. The non-transitory machine-readable medium of claim 13, wherein, to generate and store the outstanding request for the lookup directory entry for the first TDU in the miss buffer, the executable instructions, when executed by the storage controller, further causes the storage controller to: determine that there is a request linked list for the lookup directory entry for the first TDU in a miss status holding register (MSHR), insert the outstanding request into the request linked list and update an end pointer in the MSHR.

16. The non-transitory machine-readable medium of claim 13, wherein the first TDU index is calculated by dividing the first LDA by a total number of L2P entries in the first TDU.

17. The non-transitory machine-readable medium of claim 13, wherein the executable instructions, when executed by the storage controller, further causes the storage controller to:

retrieve a lookup directory entry for a second TDU from the in-memory lookup directory;
determine that the lookup directory entry for the second TDU is valid;
process all outstanding request(s) for the lookup directory entry for the second TDU in the miss buffer; and
update the cache of lookup directory entries with the lookup directory entry for the second TDU.

18. The non-transitory machine-readable medium of claim 17, wherein, to process all outstanding request(s) for the lookup directory entry for the second TDU in the miss buffer, the executable instructions, when executed by the storage controller, further causes the storage controller to: process all outstanding request(s) in a request linked list for the lookup directory entry for the second TDU in a miss status holding register (MSHR), release the request linked list and clear the MSHR.

\* \* \* \* \*